(12) United States Patent  
Fairchild et al.

(10) Patent No.: US 11,856,248 B2  
(45) Date of Patent: Dec. 26, 2023

(54) SYSTEM AND METHOD FOR SCORING AUDIENCE RESPONSIVENESS AND EXPOSURE TO TELEVISION ADVERTISING

(71) Applicant: tvScientific, Inc., Rolling Hills Estates, CA (US)

(72) Inventors: Jason Fairchild, Rolling Hills Estates, CA (US); David Koye, Richmond, VA (US)

(73) Assignee: tvScientific, Inc., Pasadena, CA (US)

( * ) Notice: Subject to any disclaimer, the term of this patent is extended or adjusted under 35 U.S.C. 154(b) by 0 days.

(21) Appl. No.: 17/710,078

(22) Filed: Mar. 31, 2022

(65) Prior Publication Data

US 2022/0329888 A1    Oct. 13, 2022

Related U.S. Application Data

(60) Provisional application No. 63/169,122, filed on Mar. 31, 2021.

(51) Int. Cl.
*H04N 21/24* (2011.01)
*G06Q 30/0273* (2023.01)
*H04N 21/254* (2011.01)
*H04N 21/81* (2011.01)
*G06Q 30/0242* (2023.01)

(52) U.S. Cl.
CPC ..... *H04N 21/2407* (2013.01); *G06Q 30/0246* (2013.01); *G06Q 30/0275* (2013.01); *H04N 21/254* (2013.01); *H04N 21/812* (2013.01)

(58) Field of Classification Search
CPC ............ H04N 21/2407; H04N 21/254; H04N 21/812; G06Q 30/0246; G06Q 30/0275
See application file for complete search history.

(56) References Cited

U.S. PATENT DOCUMENTS

| | | |
|---|---|---|
| 10,789,619 B1 | 9/2020 | Kahrl et al. |
| 2001/0054026 A1 | 12/2001 | Choate |
| 2004/0107137 A1 | 6/2004 | Skinner |
| 2006/0169769 A1 | 8/2006 | Boyarsky et al. |
| 2008/0066107 A1 | 3/2008 | Moonka et al. |
| 2009/0170614 A1 | 7/2009 | Herrmann et al. |

(Continued)

FOREIGN PATENT DOCUMENTS

WO    2012144825 A2    10/2012

OTHER PUBLICATIONS

International Search Report and Written Opinion for International Application No. PCT/US2022/022942, dated Aug. 9, 2022, 15 pgs.

*Primary Examiner* — Chenea Davis
(74) *Attorney, Agent, or Firm* — Patent Law Works LLP

(57) ABSTRACT

A system and methods are disclosed for scoring audience responsiveness or exposure to viewing of paid content or advertising via connected television devices ("CTV") and/or over-the-top ("OTT") delivery mechanisms. The scoring system and method determines relevant data and creates and records the relevant data in an "Ad Exposure File" and an "Advertiser Outcome File" and at regular intervals compares them to identify matches via overlapping combinations of IP Address/DID, Timestamp (for confirmation of appropriate recency) and recording a conversion event to the "Exposed Household Record." of the appropriate household on the Ad Exposure File.

19 Claims, 10 Drawing Sheets

(56) References Cited

U.S. PATENT DOCUMENTS

| | | | |
|---|---|---|---|
| 2009/0259518 A1* | 10/2009 | Harvey | G06Q 30/02 |
| | | | 705/7.29 |
| 2012/0116868 A1 | 5/2012 | Chin et al. | |
| 2012/0254149 A1 | 10/2012 | Ramsay | |
| 2013/0014223 A1 | 1/2013 | Bhatia et al. | |
| 2013/0339111 A1 | 12/2013 | Ross et al. | |
| 2014/0052546 A1 | 2/2014 | Phan et al. | |
| 2014/0237498 A1* | 8/2014 | Ivins | G06Q 30/02 |
| | | | 725/14 |
| 2014/0282655 A1 | 9/2014 | Roberts | |
| 2014/0351041 A1 | 11/2014 | Brown et al. | |
| 2015/0220999 A1 | 8/2015 | Thornton et al. | |
| 2015/0238865 A1 | 8/2015 | Jeong | |
| 2016/0019587 A1* | 1/2016 | Hueter | G06Q 10/04 |
| | | | 705/14.53 |
| 2016/0132936 A1 | 5/2016 | Hertel et al. | |
| 2016/0162940 A1 | 6/2016 | Kang et al. | |
| 2016/0191962 A1 | 6/2016 | Buddha et al. | |
| 2017/0169462 A1 | 6/2017 | Meredith et al. | |
| 2017/0372356 A1 | 12/2017 | Frommann et al. | |
| 2018/0343495 A1 | 11/2018 | Loheide et al. | |
| 2019/0251603 A1 | 8/2019 | Jaatinen et al. | |
| 2019/0379924 A1 | 12/2019 | Massoudi | |
| 2020/0279626 A1* | 9/2020 | Ansari | H04L 63/08 |
| 2021/0144426 A1 | 5/2021 | Navarre et al. | |
| 2021/0185407 A1* | 6/2021 | Marshall | G06Q 30/0275 |
| 2021/0258654 A1* | 8/2021 | Kurzynski | H04N 21/252 |
| 2022/0092638 A1 | 3/2022 | Shankel et al. | |

\* cited by examiner

SYSTEM AND METHOD FOR SCORING AUDIENCE RESPONSIVENESS AND EXPOSURE TO TELEVISION ADVERTISING

CROSS REFERENCE TO RELATED APPLICATION

This application claims priority under 35 USC § 119(e) to U.S. Provisional Application No. 63/169,122, entitled "System and Method for Scoring Audience Responsiveness to Television Advertising" filed on Mar. 31, 2021, the entirety of which application is herein incorporated by reference.

BACKGROUND

1. Field of the Invention

The present invention relates to paid content or advertisement ("ad") placement for viewing over the internet via connected television devices or other devices that facilitate viewing of content over the internet. More particularly, the present invention relates to a system and methods for scoring audience responsiveness or exposure to viewing of such paid content or advertising on television or other connected television devices ("CTV") as well as via over-the-top ("OTT") delivery mechanisms for viewing of television and video content online.

2. Description of the Related Art

With the popularity and use of the Internet for streaming content, connected television or "CTV" use has grown dramatically in recent years. A CTV is a device that can connect to a TV or a smart TV that facilitates the delivery of streaming video content over the internet. A smart TV is a television with a built-in internet connection and media platform. No additional equipment is required to stream videos. Instead, videos are most often streamed via apps that are downloaded.

Other connected devices that connect directly to a traditional television (not a smart television) and the internet and enable apps that are downloaded for viewing videos include Xbox, PlayStation, Roku, Amazon Figure TV, Apple TV, Chromecast, and more. Gaming consoles act as the connected devices that provide access to apps from their app stores. These are referred to as Over-the-Top ("OTT") devices. The advanced TV ecosystem that has emerged is a broad category that includes data-driven linear TV, addressable TV, OTT, and CTV.

This ecosystem is constantly growing and evolving as new technologies enter the ecosystem. As recognized by those skilled in the art, OTT can refer to premium video content that is streamed over the internet across any app or website, which may or may not require users to subscribe to a traditional "pay TV service." Users may access OTT content via streaming service aggregators, a standalone app, a virtual multichannel video programming distributor ("MVPD") on a TV, desktop, tablet or smartphone. Some refer to OTT as digital video, but that does not distinguish video content as premium, professionally-produced long-form versus free short-form video content. Four main streaming companies account for about 80% of OTT volume. These are Amazon via its app or website, Hulu via its app, Netflix via its app or website and YouTube Premium via its app or website.

With this growth there has been an equally dramatic growth and migration to CTV, OTT, or like advertising. For example, for consumers, "CTV" is a different way to watch TV across multiple types of screens with no cable or satellite subscription required. For advertisers, it's an innovative way to reach a new and unique audience. Today's viewers are increasingly turning to diverse viewing options that don't necessarily involve a traditional television. They are watching smart TVs, laptops, smartphones, game consoles (Nintendo switch, Xbox, PlayStation) and other connected devices such as Amazon Fire, Roku, and Apple TV. However, programmatic advertising presents a complex ecosystem involving a complicated interplay between several entities, including content providers, advertisers (both informed and uninformed), and users or viewers who browse the internet to view all types of streamed content available via websites that are of interest to them.

With connected TV advertising, advertisers can typically reach television viewers that advertisers cannot reach without traditional TV commercials. Superior targeting capabilities involve connected television audience targeting, by which companies can be sure that marketing dollars are going towards the most valuable and targeted viewers. In this industry, programmatic platforms allow measurement of the results of connected TV campaigns with both digital and traditional metrics, including video completion rates. Growing audience targets millennials and the growing population who do not use cable TV, also known as "cord cutters."

Connected TV, OTT, or like advertising is becoming a powerful open platform that caters directly to a variety of new applications and services to homes, mainly for the young, middle-aged, and older adult population. Such a robust, tech-savvy audience represents incredible marketing opportunities with brands continuously seeking metrics to target specific advertising to viewers. Similar to other video advertisements, connected TV advertisements may be pre-roll or mid-roll. Pre-roll ads are those shown before content and mid-roll ads are those shown in the middle of the content. Considering most ads on smart TVs cannot be skipped over and users are highly engaged (having carefully selected content that they are most interested in viewing), CTV advertisements are extremely effective. Moreover, CTV adds are far more measurable than traditional TV advertising. With access to data, advertisers can quickly adjust they strategy based on evaluating what has or has not been working for their campaigns.

It should be recognized CTV has many advantages over linear TV (i.e., cable, satellite, antenna) is its inherent precision. It unlocks a level of insight that allows advertisers to run ads and know exactly how many people viewed them, all the way down to the last digit. CTV also provides advertisers insights into completion rates, by providing an exact understanding of how many people saw the ad from start to finish, and how many dropped out.

Performance marketers expect much more. As with other performance marketing channels, such as paid search and social, performance marketers desire a full view into the customer journey to truly understand the impact of their CTV campaigns. Mechanisms for CTV measurement begins after an ad is displayed. Ways of monitoring may include measuring traffic to the advertiser's website after a CTV ad is shown. It's able to identify other devices visiting the site from the same household that saw the ad, which allows determining site visits driven by that ad impression. In addition, monitoring the advertiser's site to see if the users that originated from the CTV campaign eventually convert is important to direct-response TV advertisers. This is recognized as a way of attributing purchases to the TV ads they run—while delivering an ad measurement experience familiar to all performance marketers.

Performance marketers find value in having their campaign data funneled into their 3rd party analytics or campaign management solution of choice. It allows them to understand the performance of their marketing efforts across disparate channels. Unfortunately, this is an area where CTV platforms can fall short—they tend to rely on siloed measurement only available through their own platforms.

There is a need in the industry for continuous improvements that can gauge audience responsiveness to CTV or OTT advertising and to create soring mechanisms that can be used to create more meaningful experiences for viewers.

SUMMARY

The present technology overcomes the deficiencies and limitations of prior systems and methods, at least in part by, providing systems and methods for scoring audience responsiveness or exposure to television advertising of all types (e.g., display or home audio) on connected television devices ("CTV") or over-the-top ("OTT") delivery mechanisms.

In some embodiments of the present invention, the audience-responsiveness scoring system may be provided in a demand-side platform ("DSP") or integrated with a DSP platform or an integrated network used to provide CTV, OTT or like advertising. The audience-responsiveness or exposure scoring system in accordance with the present invention determines and designates unique household identification data or identifiers ("ID") by obtaining and using a combination of signals including signals representative of a timestamp, CTV identification or ID, "IP" address and physical location etc. As is recognized in the online industry, an Internet Protocol ("IP") address is a numerical label assigned to each device connected to a computer network that uses the Internet Protocol for communication. An IP address serves two main functions: host or network interface identification and location addressing.

In accordance with some embodiments of the present invention, the audience-responsiveness scoring system has a Household ID ("HH-ID") collection engine configured to collect Household ID signals from a particular advertiser. By way of example, a particular advertiser for illustration purposes is designated as "Advertiser A." Therefore, the "Advertiser A" CTV Ad Delivery, via a combination VAST Tag 1×1 IMG Tracker and Ad Server Logs records to a platform file called "Ad Exposure File," creating exposed household records. For example, an example record may be designated as "Exposed Household Record 001." Here, the system records any one or more of the IP address, location, time stamp, Device ID, UA, advertiser, category, product, price point, offer, and call to action.

In some embodiments of the present invention, additional Household devices are appended to "Exposed Household Record 123" via Device ID anchored by IP address, Timestamp, location cues, etc., and recording new identifiers including Device ID.

In some embodiments of the present invention, "Website Visit Data" includes the initial visit, purchase or other desirable action on "Advertiser A's" Website or the like, which is recorded by a JavaScript tracking pixel or s2s post back and stored in the "Advertiser Outcome File," thereby, creating "Visitor Record 001," with a recording of the IP address, location, time stamp, event increment, value of conversion, conversion type, or the like.

In some embodiments of the present invention, at regular intervals data from the AEF ("Ad Exposure File") and AOF ("Advertiser Outcome File") are compared to identify matches via overlapping combinations of IP Address/DID, Timestamp (for confirmation of appropriate recency) recording a conversion event to the "Exposed Household Record." of the appropriate household on the "Ad Exposure File." The records of both files ("Ad Exposure File" and "Advertiser Outcome File") are appended with the ID from the other file for future analysis.

In some embodiments, the system and method in accordance with the present invention collects "lifetime value metrics" from the various advertisers and adds them to each household record that is created. In some embodiments, the system and method in accordance with the present invention tracks the sequence, frequency and cross-channel exposure of advertising.

In yet other embodiments, the system and method identify the category of the advertising offer (e.g., against one of the Interactive Advertising Bureau ("IAB") categories or other hierarchy) and measure response rates for each ad against each household.

In yet other embodiments, the system and method of the present invention determine the index responsiveness based on frequency prior to action, total seconds exposed prior to action, a count of actions across distinct advertisers in the same category or the like.

In some embodiments, the system and method of the present invention determine responsiveness by creative type or outcome event data, for example, including the length of commercial and other variables such as visual components, audio components, and elements in the ad creative or outcome (e.g., color scheme, actor gender, etc.)

BRIEF DESCRIPTION OF THE DRAWINGS

The present invention is illustrated by way of example, and not by way of limitation in the figures of the accompanying drawings in which like reference numerals are used to refer to the same or similar elements.

DETAILED DESCRIPTION

Figure 1A:
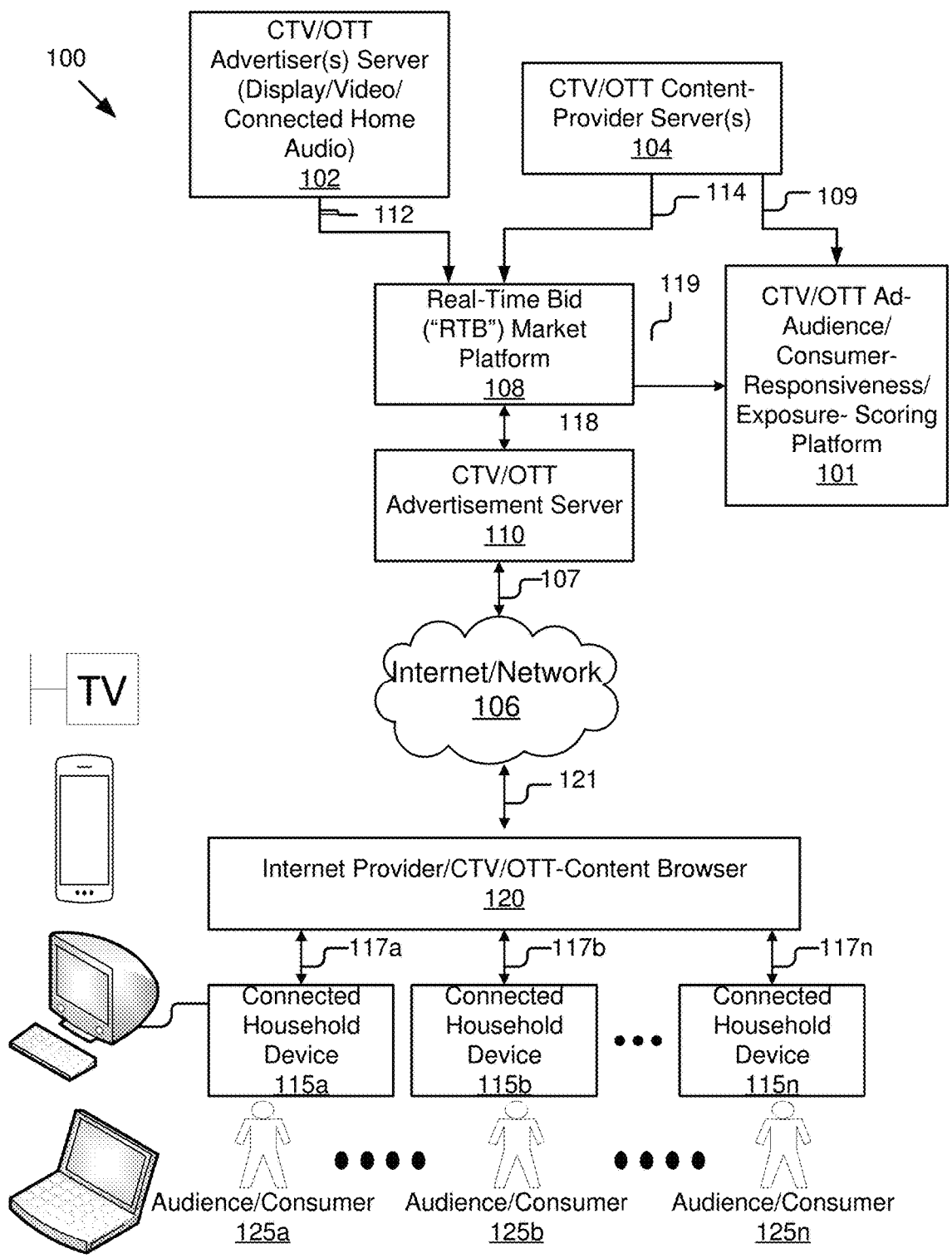
FIG. 1A is high-level block diagram, illustrating an example system for scoring audience-responsiveness and/or exposure according to some implementations of the present technology.

The systems and methods of this technology are configured to be implemented in a CTV, OTT, or like Audience-Responsiveness-Scoring platform that measures audience responsiveness and scores it. The systems and methods of this technology are configured to be implemented in a demand-side platform ("DSP") for CTV, OTT, or like advertising. A typical demand-side platform integrates with multiple sources such as DMPs, ad exchanges, supply sources etc., in an infrastructure that provides secure, elastic, compute capacity in the "cloud" that comprises computers from Virtual Machines and Bare Metal servers to HPC (High Performance Computing), GPU (Graphics Processing Unit), container orchestration and management etc.

A demand-side platform is typically integrated in three phases, the first, involving research and set up. The second phase is the development stage and the final phase is testing the integration. Demand-side platforms typically support cross-channel platforms and integrate with all the main ad exchanges. The bidding process is one of the key features of a DSP. This is performed by a component called "bidder" which is responsible for placing bids on inventory during real-time bidding auctions. Usually, multiple bidders will be there to manage all real-time demands simultaneously.

An Ad Server is an essential tool for creative or outcome management and for storing an ad creative or outcome and displaying to a user/viewer when required. Some DSPs have their own ad servers while others may connect to external ad servers depending on the architecture. A Campaign tracker helps to record the data regarding the performance of a particular campaign. The data includes clicks, impressions and spends. Once the data is recorded, it will be transferred to the reporting dashboard. The campaign tracker helps the user/viewer to determine the performance of a particular campaign. A reporting database stores all the data received from the campaign tracker. Users/viewers can generate reports by making use of this information. User/viewer data is an important part of the DSP, which helps in processing and storing important information about the user/viewer/audience. User/viewer data may include information regarding buying habits, interests, age groups, demographic details etc. Marketers can make use of this information to improve the effectiveness of their campaigns and bring in better results.

A user interface is the dashboard where the marketers work on creating, managing and optimizing their campaigns. Ads in DSPs are sold in a few ways, depending on the DSP. DSPs specifically built for performance campaigns such as app-installs, charge a fee based on CPI (Cost per Install) or CPV (Cost per View) for video advertising campaigns. Prices of ad impressions in DSPs are determined by a real-time bidding (RTB) process, that takes place within milliseconds, as a user loads content or interacts with an app.

DSPs are unique as they offer the same capabilities as what ad networks used to provide, with an addition to a suite of audience targeting options. The advantage of DSPs over ad networks is that they provide advertisers with the ability to do real-time bidding on ads, serve ads to a multitude of platforms, track and optimize—all under a single interface. Some targeting options offered by a DSP include—demographic targeting (targets based on demographic features such as age (or age group), job title, gender, education etc.), device targeting (shows viewers ads on specific devices to improve the personalization), re-targeting (targeting existing customers) and so on. DSPs are also used for retargeting campaigns. This is possible because they are able to manage large volumes of ad inventories and recognize ad requests with an ideal target audience, targeted by the advertiser. The DSP in accordance with the present invention offers a self-serve platform, which is an excellent way to manage ad campaigns. This offers targeting, bidding, budgeting and optimizing of ad campaigns. A DSP can integrate with a data management platform (DMP) that stores audience data, usually coming from multiple sources. It allows advertisers to create target audiences for their campaign based on 1st party and 3rd party audience data. A DMP acts as a single platform that consolidates online and offline data from various advertisers, creating demographics, behavioral and affinity segments which are then used as targeting options in digital advertising. Performance data from live campaigns are then fed back into the DMP, improving the accuracy of the data. DMPs allow advertisers to reach their specific target markets while reducing wastage in advertising. A DSP provides global reach and effective targeting. Through the present DSP, advertisers can connect to different segments of audiences by applying various targeting criteria.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus for performing the operations described. Parts of this apparatus may be specially constructed for the required purposes, or it may comprise general-purpose computing elements that are selectively activated or reconfigured by a special computer program stored in the computer to operate the specific functionalities described in this application to create a new system. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Portions of the present technology may take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used in combination with programs in accordance with the teachings herein, or it may prove convenient to construct more specialized apparatuses to perform certain required method steps. The required structure for a variety of these systems will appear from the description below. In addition, the present invention is not described with reference to any particular programming language. It will be appreciated that a variety of programming languages, for example, high level programming languages such as "C," "Java," or "Pascal," or "Python" or other may be used to implement the teachings of the technology as described herein. The computers may be specially programmed, and be configured with special purpose hardware. Each computer may have a single processor, a multiprocessor or may comprise multiple computers, each of which may include a single processor or a multiprocessor, operably connected over a computer network. Each computer may be controlled by one of a variety of operating systems including Microsoft Windows, Macintosh, Linux, Unix, or a Java-based operating system, to name a few.

Each computer in the system may include one or more input and output (I/O) unit, a memory system, and one or more processing units. The input-output ("I/O") units of each computer may be connected to various input/output devices, such as a mouse, keyboard, video card (video monitor), sound card (with speakers), network card and printer. The memory system in a typical general purpose computer system usually includes a computer readable and writeable nonvolatile recording medium, of which a magnetic disk, a flash memory and tape are examples. The memory system operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

System Architecture Overview

FIG. 1 illustrates a block diagram of a CTV, OTT, or like ad-audience-responsiveness scoring platform/system in a demand-side platform 101 illustrated in a CTV, OTT, or like digital advertisement ("ad") placement environment 100 in which the disclosed implementation of the CTV, OTT, or like audience responsiveness analytics index system is operable. The environment 101 includes: an online advertiser server or website 102 (representing one or more online advertisers), an online content server or website 104 (representing one or more online content providers), a network 106, and a real-time bidding ("RTB") market platform 108. The online advertiser server 102 may be a computing system (of one or more computers or processors, either linked or distributed) that submits bids to the RTB market platform 108 to purchase content-provider inventory and have advertiser advertisements shown in the CTV, OTT, or like environment. The advertiser server 102 is illustrated as coupled to the RTB market platform via signal line 112 and the content server is illustrated as coupled to the RTB market platform via line 114. The content server 104 may be a computing system that maintains content for televising that attracts viewers and contains placeholders for ads (from the ad inventory) that are submitted to the RTB market, for sale to advertisers. The content server 104 has access to data provided by the CTV, OTT, or like audience responsiveness analytics index, either directly (not expressly illustrated in FIG. 1) or otherwise. The RTB 108 may be a computing system that provides a real-time bidding market that allows advertisers to bid on provider inventory in real-time. While only a single advertiser server 102, a single content server 104 and a single network 106 are shown in FIG. 1, it should be recognized that there may be thousands or even millions of advertiser servers 102, content servers 104, or networks 106 that integrate in a programmatic advertising environment. FIG. 1 is merely provided as one example illustration of the systems 102, 104, and 106, which present the environment in which the present technology may be implemented.

The advertiser server 102 is coupled by signal line 112 for communication with the real-time bidding market 108. Although not explicitly shown in FIG. 1, it should be recognized that any and all the signal lines illustrated in FIG. 1 may route, via the network 106, as illustrated in FIG. 1. The advertiser 102 is coupled to the real-time bidding market 108 to send bids on impressions, and also provides advertisement content, advertising target information, price, or any other information related to the impression or necessary to serve the ad on streaming content. The RTB market platform 108 is a real-time bidding market, which allows advertisers to bid on inventory in real-time.

The content site 104 is a computing device for providing any type of video content for viewing as streamed content on a household or related device. The signal line 114 provides information to the RTB about which impressions on the content site are available for the RTB market. A control line 109 from 104 to 106 indicates content provision from the online content servers.

The network 106 is a conventional type, wired or wireless, and may have any number of configurations such as a star configuration, token ring configuration or other configurations known to those skilled in the art. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The real-time bidding market platform 108 is coupled by signal line 118 to an advertisement server 110, which serves ads, for example video ads. The ad server 110 is software that receives requests for ad units, submits, and then fulfills those requests with content. The advertisement server 110 is coupled to the network 106 for communication and interaction with online advertisers 102 and the content site 104. A viewer (audience) 125 who is viewing streamed content is a potential consumer of ads. There may be any number of viewers (audience) 125a, 125b, through 125n, who are coupled via the network 106 to online sites 104 from which content may be streamed. For example, when a viewer in the audience (125a-125n) downloads content for viewing on connected household devices 115a, 115b, through 115n, that is supplied by an online content site 104, requests are sent to the content site 104 (the content provider's server) for content. It should be recognized by those skilled in the art that the connected household devices 115a, 115b, through 115n may be a display device or a home audio device. The connected household devices 115a through 115n used by consumers include, but are not limited to, one or more of: TVs (including Smart TVs), mobile devices (cell phones, smartphones, media players, tablets, notebook computers, laptop computers, and wearables), desktop computers, networked photo frames, set-top boxes, gaming consoles, streaming devices, and devices considered to function within the "Internet of Things" such as domestic appliances fridges, etc.), and other networked "in-home" monitoring devices such as thermostats and alarm systems. The viewer (125a-125n) navigates to content for streaming via a web browser 120. The browser may be any one of Chrome, Safari, Firefox, Internet explorer or the like. The viewer may otherwise be referred to as a user, consumer, or client. Consumers, viewers or potential viewers of the advertising content may have previously purchased the product or service that is being advertised or may advantageously to the advertiser be learning of the product or service for the first time when they view the advertising content as it is displayed or appears in audio form.

The content site (provider) serves up the content, which includes executable JavaScript tags. Once these tags are loaded in the viewer's content browser 120 (via lines 117a, 117b, through 117n), they are executed (via lines 121 and 107) and notify the ad server 110 that there is an impression that needs filling in the streaming content. The impression is then submitted to the Real-Time Bidding ("RTB") market platform 108, where advertisers bid to fill the impression with their video advertisements. The RTB market platform reads in the market floors for each of the competing advertisers and uses these market floors, along with the advertiser bids, to determine the winner of the auction and their clearing price. In the event that all of the received bids are too low, the Auction may not clear. The operation of the RTB market platform 108 will be described in more detail below with reference to FIG. 2.

Figure 1B:
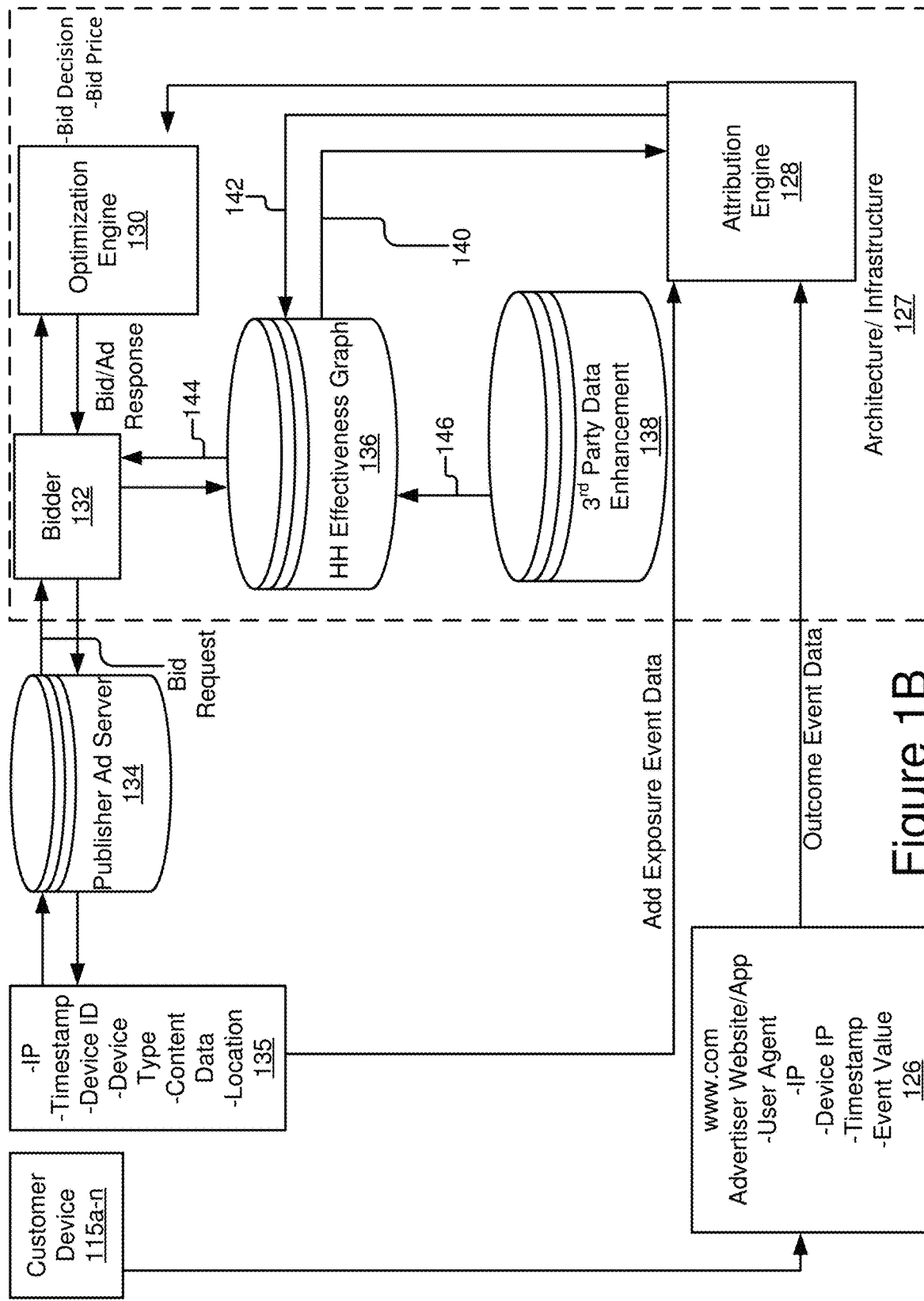
FIG. 1B is a high-level block diagram illustrating the infrastructure and architecture of the example system with the flow of event and outcome data.

Referring also to FIG. 1B, which illustrates the architecture and flow of event data, the customer device 115a-n may access an advertiser website/app (e.g., www.com) designated by reference numeral 126, at which point, the event and related data is generated and recorded as "outcome event data." The outcome event data in some embodiments of the present invention may include the "User Agent," the "IP address," the "Device IP," a "Timestamp," or an "Event Value." The infrastructure or architecture of the platform 127 includes an attribution engine 128, to which the outcome event data is continuously provided. In some instances, the outcome event data may be provided at designated intervals determined by the platform. The attribution engine 128 is coupled to an optimization engine 130, which provides a bid decision and bid price to the bidder 132. As illustrated, the bidder provides a bid or ad response to the publisher ad server 134 when a bid request is received by the bidder 132. Ad Exposure Event data is continuously tracked and recorded as each bid request is generated. For example, event data that may be recorded includes the "IP," a "Timestamp," a "Device ID," a "Device Type," "Content Data," "Location," or the like compiled at a storage location designated by reference numeral 135. A household ("HH") effectiveness graph 136 is coupled to the bidder 132 and serves to provide additional data from a 3rd Party Data Enhancement server 138 as designated by signal line 146. Examples of the additional data may include, but not limited to, postal data, latitude/longitude data, IP type, age, gender, and household income. In addition, new IDs are linked to known households and provided to the attribution engine 128, as designated by signal line 140. And, the attribution engine 128 adds new results to known or new households, as designated by signal line 142. The household effectiveness graph 136 enhances bid requests with additional data as designated by signal line 144. The outcome event data is used by the scoring engine to accord responsiveness scores to advertising as further described in FIG. 3.

Figure 2:
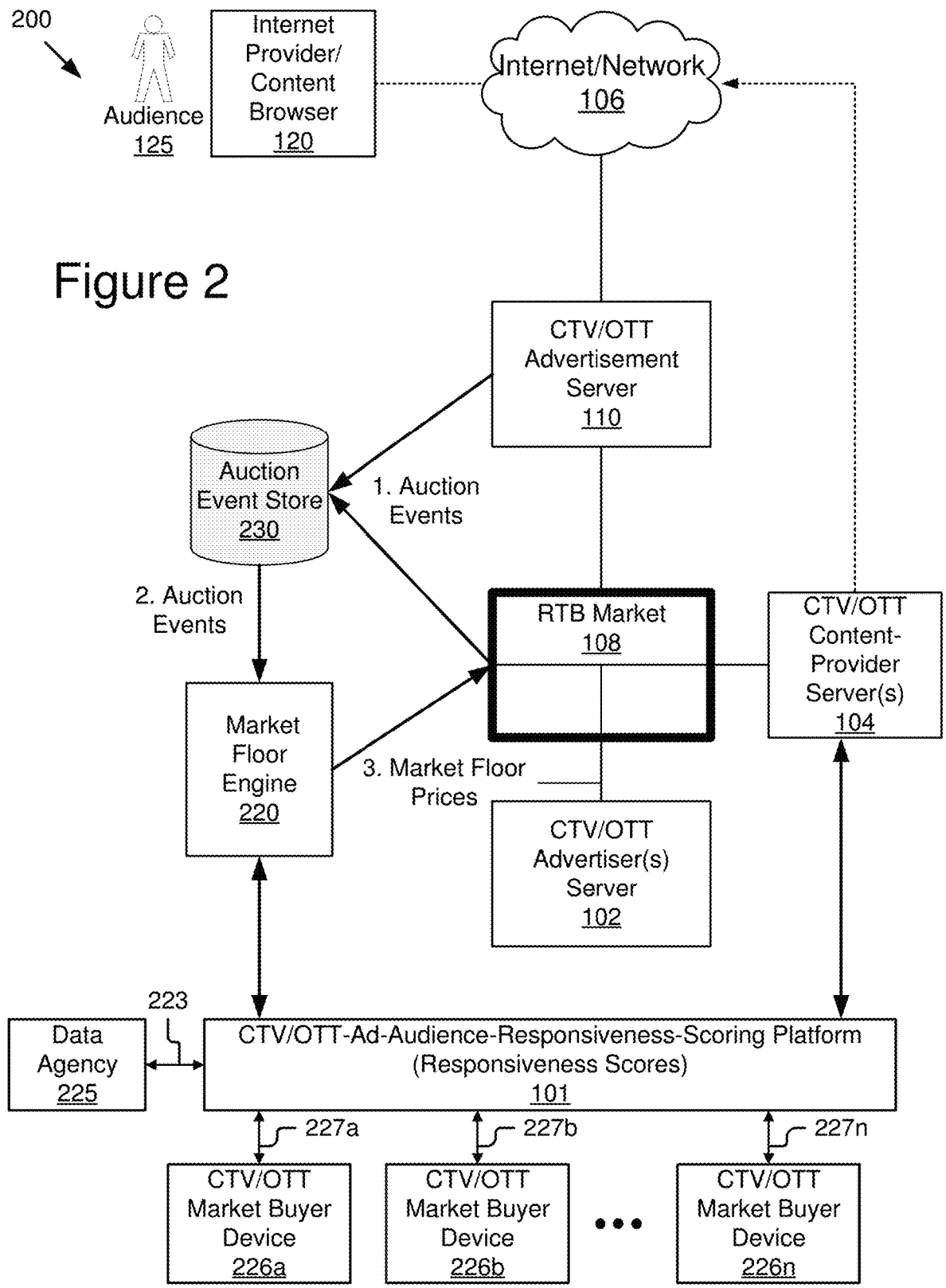
FIG. 2 is a high-level block diagram, illustrating an example, configured to operate with a market floor engine and auction event store operating a floor auction for CTV ad placement.

Referring now to FIG. 2, the RTB market platform 108 implements a real-time bidding market. In the implementations described here, the RTB market platform 108 conducts a market floor auction for ad placement (e.g., video), which is a specialized auction that determines an auction winner, auction clearing price based on the bids submitted by advertisers, and per-advertiser market floors that are calculated and distributed by the market floor system 100. In some implementations, an auction event store 230 may include a large collection of computers arranged in a distributed, computational, and storage grid. The auction event store 230 may store events from the Advertisement server 110 and RTB market platform 108. A market floor engine 220 determines and provides market floor prices, which may in some instances be dynamically or selectively set by providers. In some implementations, the market floor engine 230 may be an analytics engine that processes auction event data in either real-time, near-real-time, or batch mode, determines market floors based on this data, and assesses the revenue impact of using these market floors compared to provider "static" floors and/or other benchmarks. The provider may determine market floors by deriving data from the CTV audience responsiveness analytics index system 224. The index system 224 may be directly coupled to either market buyer devices 226a, 226, or 226n, via lines 227a, 227b, through 227n, or an agency 225, via line 223, to directly provide data and revenue value to any of these entities.

During an RBT auction, the advertisement server 110 and RTB market platform 108 generate a number of events that include information about the context in which the RBT auction is occurring. An "event profile" (with the type of information available in the auction bids that are received) may be generated when all of the bids from the advertisers in an RBT auction have been received. An auction event store 230 may store information available in the "auction complete" event generated when an auction has completed. The auction event store 230 may include a large collection of computers arranged in a distributed, computational, and storage grid. The auction event store 230 in some implementations stores events from the advertisement server 110 and the RTB market system 108.

Figure 3:
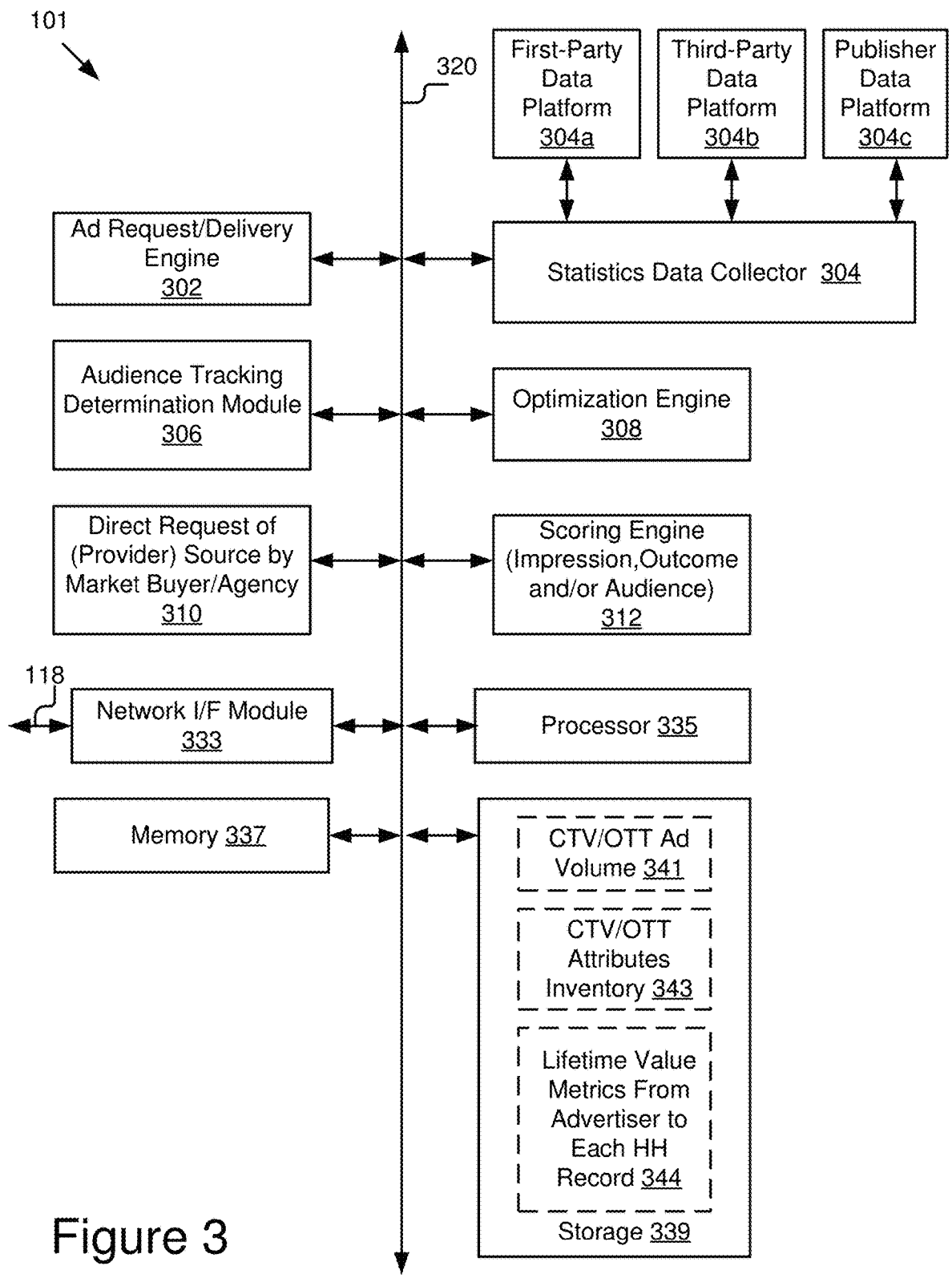
FIG. 3 is a block diagram, illustrating an example CTV audience-responsiveness scoring system and its hardware components.

Referring now to FIG. 3, an example implementation of the hardware structure is illustrated. One or more of the ad request and delivery engine 302, the statistics data collector 304, the audience tracking module 306, the optimization engine 308, and the direct request source 310 are software or routines executable on the processor 335. In some implementations, one or more of the delivery engines 302, the statistics data collector 304, the audience tracking module 306, the optimization engine 308, and the direct request source 310 store data that, when executed by the processor 335, causes the collectors/modules to perform the operations described below. In yet other implementations, one or more of the ad request and delivery engine 302, the statistics data collector 304, the audience tracking module 306, the optimization engine 308, and the direct request source 310 (from publisher) are instructions executable by the processor 335 to provide the functionality described in the flow charts that follow. In still other implementations, one or more of the delivery engines 302, the statistics data collector 304, the discrete revenue value determination module 306, the optimization engine 308, and the direct demand source 210 (publisher) are stored in the memory 337 and are accessible and executable by the processor 335. The storage 339 has the CTV/OTT ad volume stored at 341, CTV/OTT attributes inventory 343, and a lifetime value metrics from the advertiser to each household 344. The scoring engine 312 scores impressions, outcomes, or audience data.

The scoring engine 312 tracks advertisement exposure and designates advertisement responsiveness scores to each advertisement. For example, in some implementations and scenarios, a particular house "HH 1234" is accorded an advertisement responsive score of "98/100" for casual gaming and another house "HH 5678" is accorded a score of "45/100," the system would automatically weigh in favor of directing a new casual gaming campaign to focus on "HH 1234." The exposure to advertising is critical to determine an extent of use and interest by a particular household to different advertising campaigns. The exposure data that is compiled translates to responsiveness/exposure scores, which are used to automatically direct advertising campaigns to interested households. This responsiveness scoring advantageously yields an increase advertising revenue and benefits consumers and advertisers. Consumers are spared from viewing advertising of little interest to them and advertisers are spared a wasted effort to exposing advertising to those who have no interest. The responsiveness scores may be a presented by ratios as illustrated here or in other ways suitable to convey the extent of exposure. Responsiveness scores may be used in algorithms to programmatically automate advertising flow in the connected television or over-the-top delivery mechanisms of streaming content. The responsiveness scores may be stored and used to create an index of responsiveness/exposure scores. This index serves as analytics database that may be used to train programmatic models that operate and execute in the dynamic advertising environment.

In some instances, the optimization engine 308 includes a multiplier (a) calculation module, a data retrieval module, and a classification module (to execute any classification criteria). The CTV/OTT audience responsiveness scoring system includes data collection engines. These engines are operated by one or more processors that comprise an arithmetic logic unit, a microprocessor, a general-purpose controller or some other processor array to perform particular computations as programmed and provide electronic display signals to a display device. The processor 335 is coupled to the bus for communication with the other components. The processor 335 processes data signals and may comprise various computing architectures including a complex instruction set computer (CISC) architecture, a reduced instruction set computer (RISC) architecture, or an architecture implementing a combination of instruction sets. Although only a single processor 335 is referenced here, multiple processors may be included. It will be obvious to one skilled in the art that other processors, operating systems, sensors, displays and physical configurations are possible.

The processor 335 is coupled to a memory that stores instructions and/or data that may be executed by the processor 335. The memory is coupled to the bus for communication with the other components. The instructions and/or data may comprise code for performing any and/or all of the techniques described herein. The memory may be a dynamic random-access memory (DRAM) device, a static random-access memory (SRAM) device, flash memory or some other memory device known in the art.

In one embodiment, storage stores data, information and instructions used by the ad request and delivery engines, data collector engines, optimization engines, and the direct request of source (from provider) by User/Agency etc. The storage is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The data storage is coupled by the bus for communication with other components of the analytics index system for impression evaluation and allocation.

One or more of the engines are software or routines executable on the processor. In some implementations, one or more of the engines store data that, when executed by the processor, causes the collectors/modules to perform the operations described below. In yet other implementations, one or more of the engines are instructions executable by the processor to provide the functionality described in the flow charts that follow. In still other implementations, one or more of the delivery engines are stored in the memory and are accessible and executable by the processor. The flow charts illustrated in FIGS. 4 through 8 describes the various operations.

Figure 4:
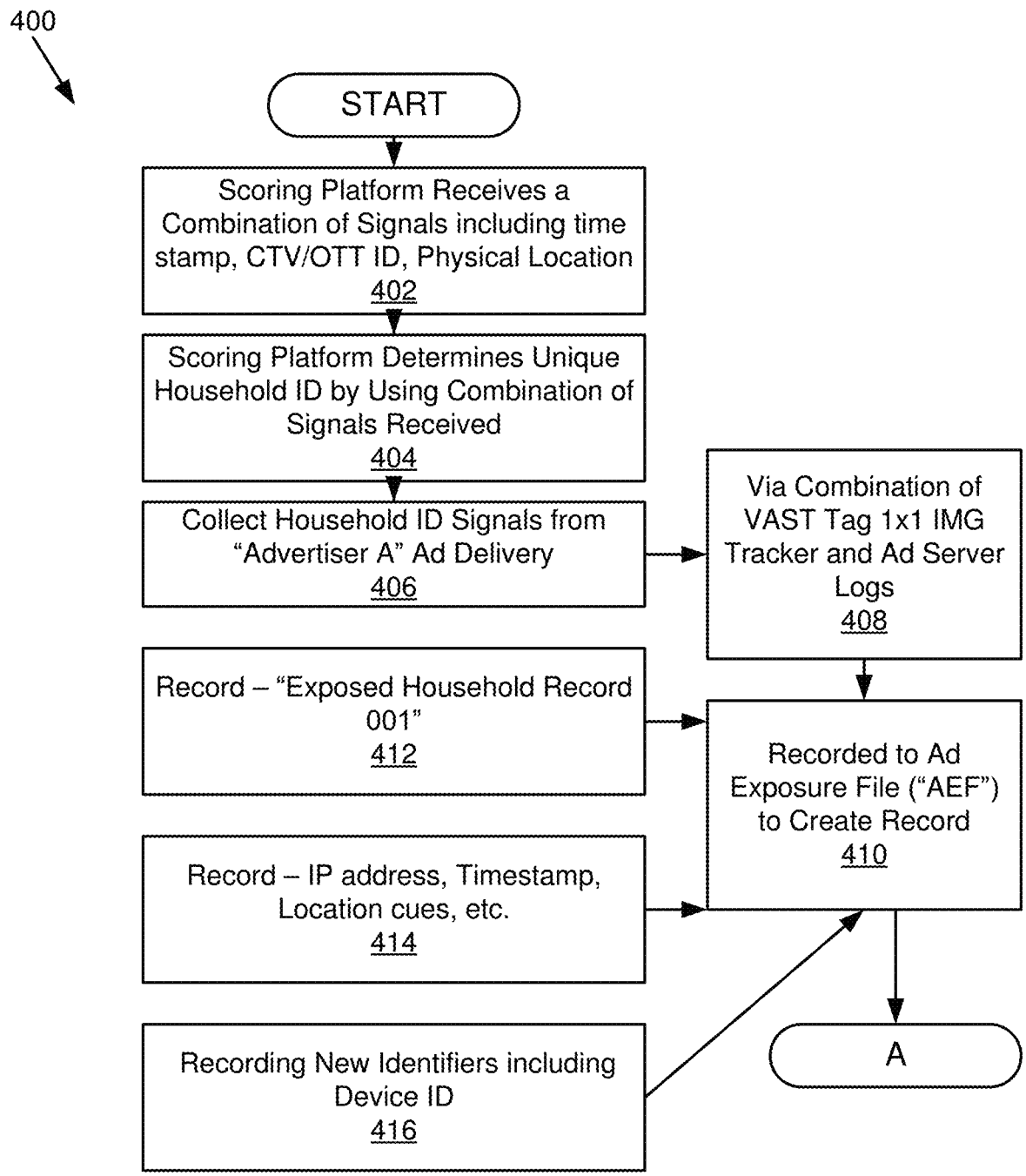
FIG. 4 is an example flow chart of operations and functions performed by the CTV audience-responsiveness scoring system.

Referring to FIG. 4, in some embodiments of the present invention, operation flow 400 begins at block 402, with the platform, system, or method, collectively referred to as the "Scoring Platform" implemented in a DSP, receives a combination of signals continuously and dynamically as events occur. These signals include for example, a timestamp, a CTV/OTT identification, a physical location etc. The operation flow 400 proceeds to the next step of one or more operations designated by block 404. The scoring platform determines a unique household ("HH") identification ("ID") by receiving and using a combination of the signals including the timestamp, CTV ID, IP, Physical Location. The method 400 proceeds to the next block of operations designated by block 406. The Household ID signals from "Advertiser A" CTV Ad Delivery are collected or captured via a combination (determined by the "Scoring Platform") VAST Tag 1×1 IMG Tracker and Ad Server Logs and recorded to an "Ad Exposure File" creating exposed household records, for example, "Exposed Household Record 001" and recording data, including but not limited to, an IP address, a location, a timestamp, a Device ID, UA, an advertiser, a category, a product, a price point, an offer, and a call to action. From that block, the operation 400 flows to the next block 408, including one or more operations for collecting Household ID signals from "Advertiser A" (example) Ad Delivery. From there, the flow 400 proceeds to the next block 410, where "Via Combination of VAST Tag 1×1 IMG Tracker and Ad Server Logs", the Household ID signals are recorded to a "Ad Exposure File" to create a Record. The "Exposed Household Record 001" by way of example illustrated in block 412 may include any one or more of IP address, a timestamp, and a location, illustrated at block 414. At block 416, one or more operations lead to recording new identifiers including a device ID. The process 400 proceeds via connector A to operations 500 described in FIG. 5.

Figure 5:
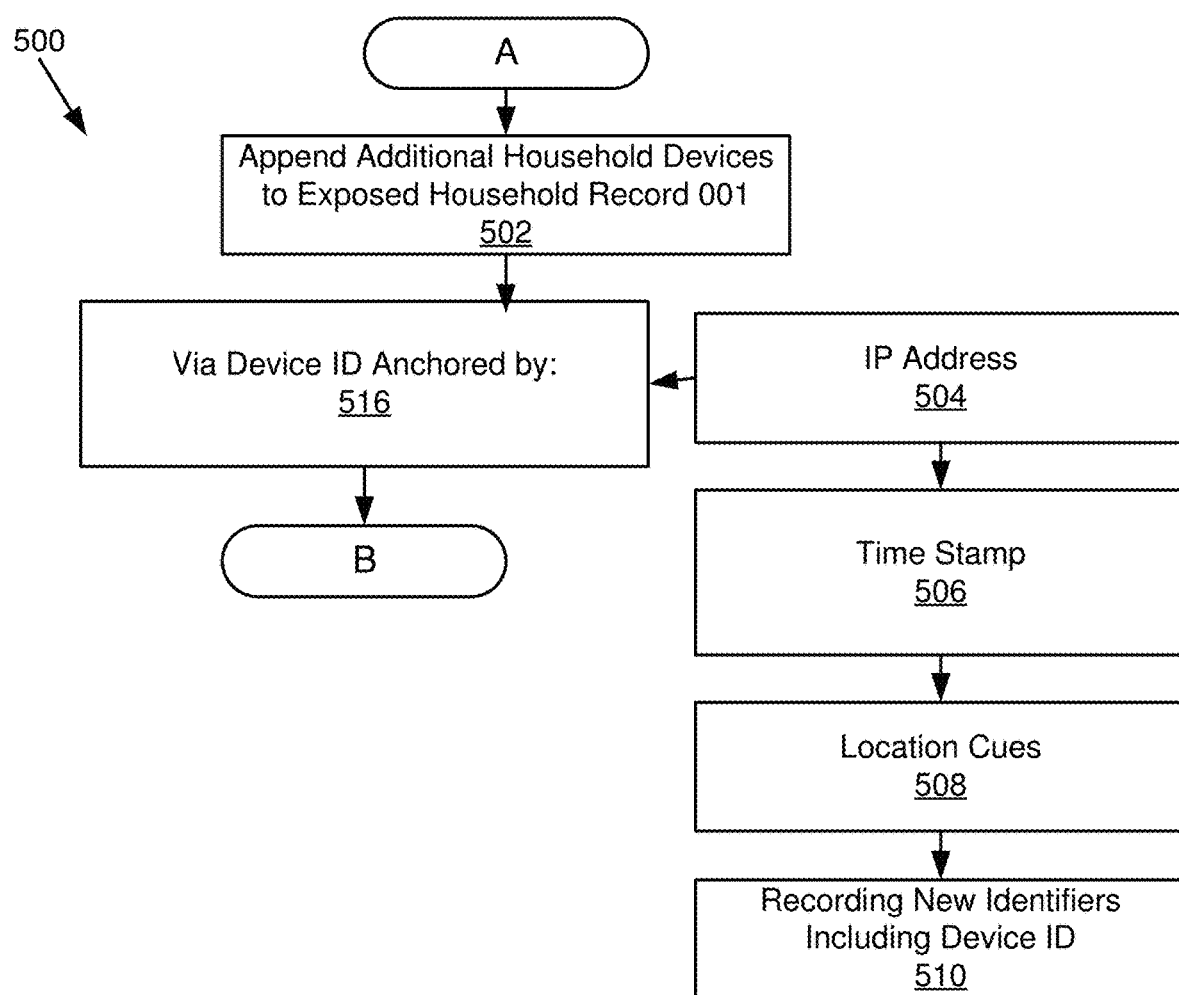
FIG. 5 continues the example flow chart of FIG. 4 illustrating additional operation and functions performed by the audience-responsiveness scoring system in accordance with the present system.
Figure 6:
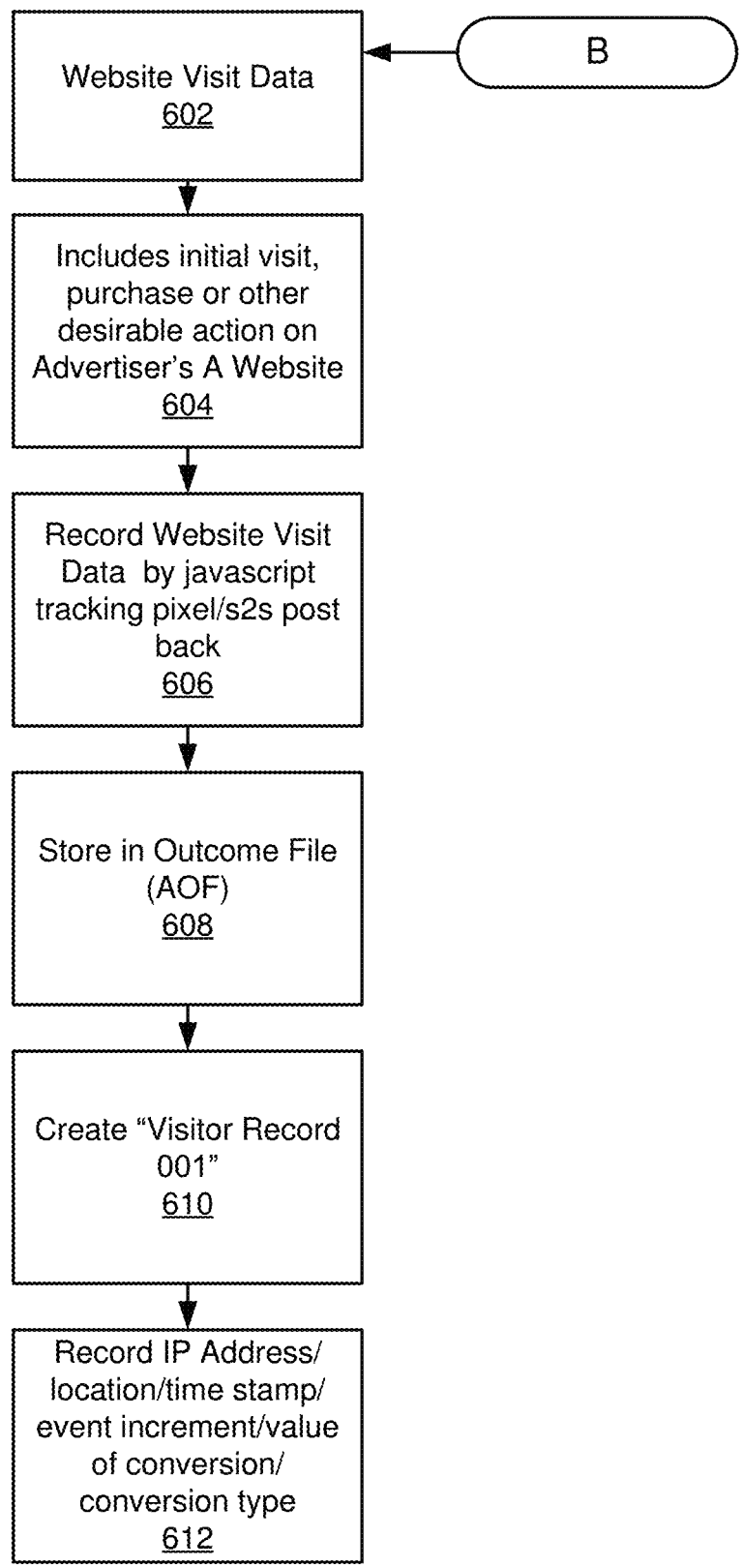
FIG. 6 continues the example flow chart of FIG. 4 illustrating additional operation and functions performed by the audience-responsiveness scoring system in accordance with the present system.

Referring now to FIG. 5, the process 500 proceeds at block 502, which includes one or more operations for appending additional household devices to the "Exposed Household Record 123." The process 500 continues to block 516, which appends additional household devices via a device identification or "Device ID." The Device ID is anchored by either an IP address as designated by block 504, a timestamp as designated by block 506, location cues as designated by block 508, etc. The process 500 continues for recording new identifiers including Device ID as designated by block 510. From block 516, the process flows via connector "B" to the operations described in FIG. 6. Block 602 illustrates compiling of "Website Visit Data." The method 600 proceeds to block 604, which represents one or more operations for tracking an initial visit, a purchase or other desirable action on the advertiser's A website or the like. The method 600 proceeds to block 606, representing recording of the website visit data by JavaScript tracking pixel/s2s post back solution. The method 600 proceeds to block 608 including one or more operations for storing the data compiled on the Advertising Outcome File ("AOF"). The method 600 proceeds to block 610 including one or more operations for creating a visitor record for each visitor. For example, the method 600 creates a record "Visitor Record 001," for a first visitor and subsequently sequential records for visitors as tracked. The method 600 proceeds to block 612, which describes one or more operations for recording data, including but not limited to, the record IP Address, the location, a time stamp, an event increment, a value of conversion, and a conversion type or the like. The website visit data including the initial visit, purchase or other desirable action on "Advertiser A's" Website is recorded by a JavaScript tracking pixel or s2s post back and stored to the Advertiser Outcome File in each visit instance, creating a visitor record, for example, "Record 001" to record the IP address, the location, the time stamp, the event increment, the value of conversion, the conversion type, or the like.

Figure 7:
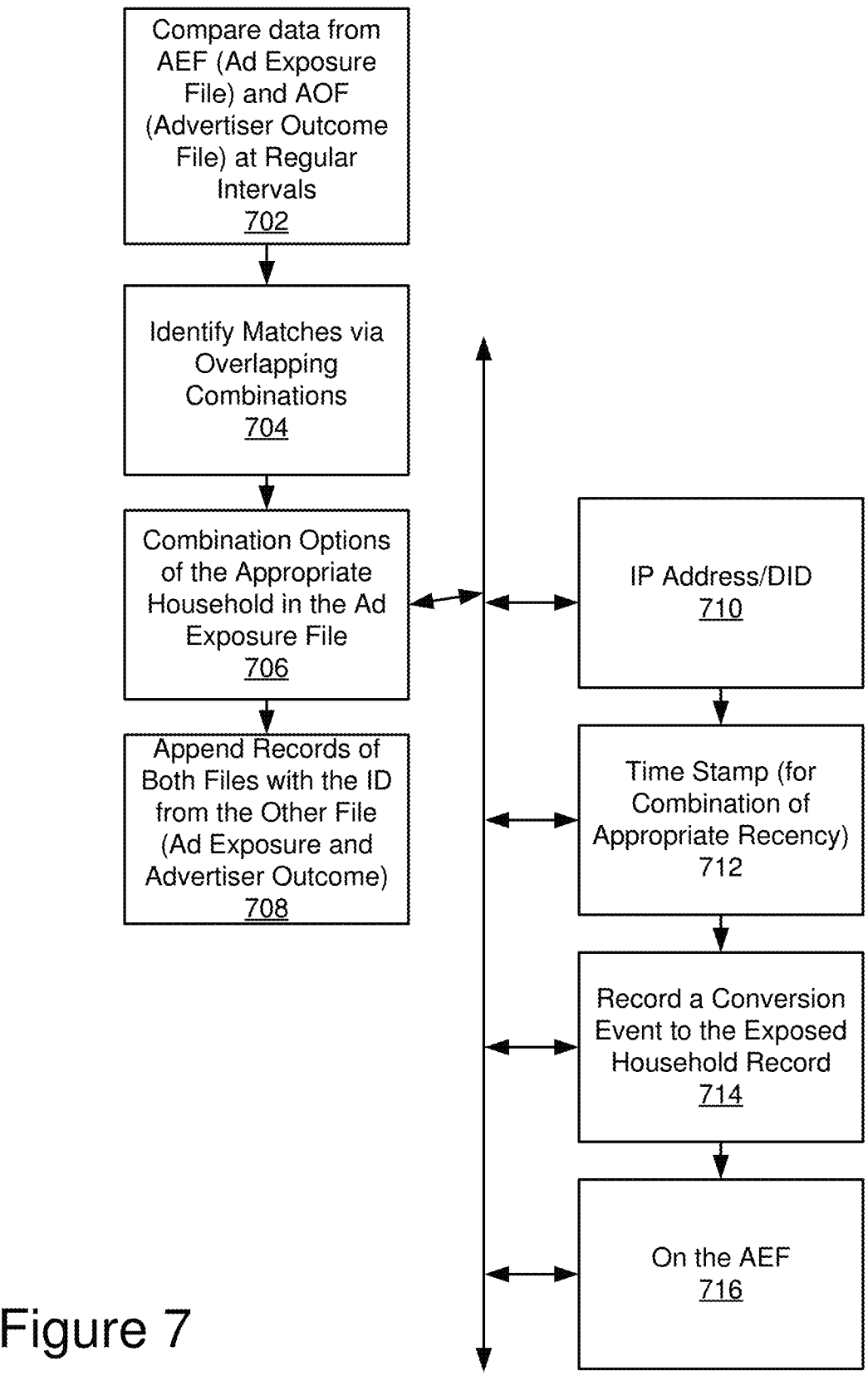
FIG. 7 continues the example flow chart of FIG. 4 illustrating additional operation and functions performed by the audience-responsiveness scoring system in accordance with the present system.

Referring now to FIG. 7, the method 700 proceeds to one or more operations performed by various engines. Block 702 represents one or more operations for comparing data from "AEF" and "AOF" files at regular intervals that are predetermined. The method 700 proceeds to block 704, which represents one or more operations for identifying matches via overlapping combinations. The method 700 proceeds to block 706, which represents one or more operations for generating combination options of the appropriate household in the Ad Exposure File ("AEF"). The method 700 continues to block 710, which includes one or more operations for creating the combinations of data, for example, from the IP Address/DID at block 710. Block 712 represents the timestamp (for combination based on appropriate recent instances. Block 714 represents recording a conversion event to the exposed household record, and block 716 represents data on the Ad Exposure File ("AEF").

The method 700 at block 708, takes the records from both files, Ad Exposure File and Advertiser Outcome and appends them with the ID from the other file for future analysis as needed.

In operation, at regular intervals, data from the Ad Exposure File ("AEF") and Advertiser Outcome File ("AOF") are compared to identify matches via overlapping combinations of IP Address/DID, timestamp (for confirmation of appropriate recent instances), with recording of a conversion event to the "Exposed Household Record." of the appropriate household on the Ad Exposure File.

For the purpose of this disclosure, it should be recognized that VAST is a Video Ad Serving Template for structuring ad tags that serve ads to video players. Using an XML schema, VAST transfers important metadata about an ad from the ad server to a video player. The VAST tag is a tracking pixel (also called 1×1 pixel or pixel tag), which is a graphic with dimensions of 1×1 pixels that is loaded when a user visits a site or opens a communication. Because it is so small, it can hardly be seen by visitors and the tracking pixel URL is the memory location on the server. The very small size of a tracking pixel is an essential part of its functionality. Tracking pixels are intentionally hidden in the background of a web page or email so that they are not part of the user experience. The intention behind this is to enable a back-end process that does not distract from the content of a website or marketing email.

Tracking pixels are embedded in the HTML code of a website, online ad, or marketing email and are retrieved from the server every time a user loads that website, ad, or email into their web browser. The server then sends the pixel tag to the user's unique IP address and logs it. The server thus counts the number of retrievals. Tracking unique pageviews is the most basic function of a tracking pixel. Web site operators, email marketers or advertisers who use a tracking pixel can analyze the server logs and see how many unique page-views their content has received.

The traffic data collected with a tracking pixel can then be further analyzed, e.g., for targeting purposes. More accurate analysis of IP addresses can provide a basic idea of where users come from geographically and what type of devices and operating systems, they use to visit a website. Tracking pixels also work across websites and servers, giving website owners and advertisers a clearer view of what users are looking for and why they are visiting the site. This data can be used to tailor content and ads to users' needs through targeted marketing campaigns. In operation, tracking pixels may be integrated into the source code of a website.

When a visitor accesses a site, the tracking pixel is loaded from the server using the <img> tag. "URL tracking pixel" indicates the location of the image on the server. The style attributes "visibility:hidden" and "display:none" specify that the image is hidden or not displayed. Alternatively, as in the first example, the values for width and height of the image may be set to "0" to prevent the tracking pixel from being displayed. Unlike tracking pixels, cookies contain code that web servers use to store certain information in a user's browser. This information may then be retrieved at a later time for various purposes.

It should be recognized by those skilled in the art that ad servers, such as "DoubleClick," use cookies to set unique user IDs that allow them to identify the same user across multiple touchpoints. When an ad server receives an ad request from a user who does not yet have such a cookie, the ad server assigns it a new unique ID. This ID is a random alphanumeric string. For each subsequent request, the cookie returns the same unique ID so that the ad server can recognize that it is the same user. Since all requests are recorded by the ad server, reports can be generated that provide a record of all touch points for each user. This functionality is not available for counting pixels. The advantage of tracking pixels for advertisers and website owners lies in the simple implementation of tracking pixels in websites, emails, and advertisements. With plugins such as adblockers, users may also make tracking pixels visible or block them.

Figure 8:
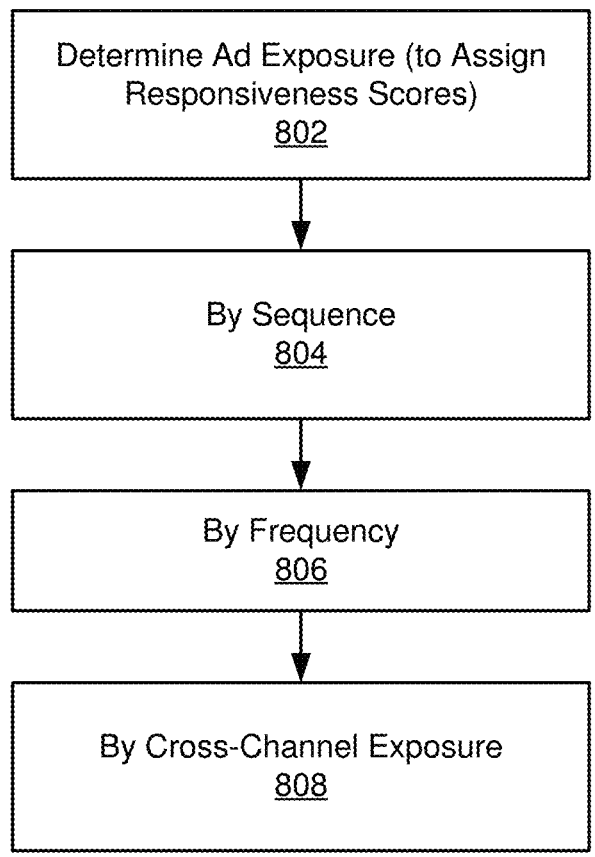
FIG. 8 is a flow chart illustrating various example metrics used to determine extent and type of advertising exposure.

Referring now to FIG. 8, the extent and level of ad exposure may be determined by tracking different events and data. For example, as illustrated by block 802, ad exposure is determined, either by sequence of ad displayed as described in block 804, by frequency of advertising as described by block 806 or by cross-channel exposure as described by block 808.

Figure 9:
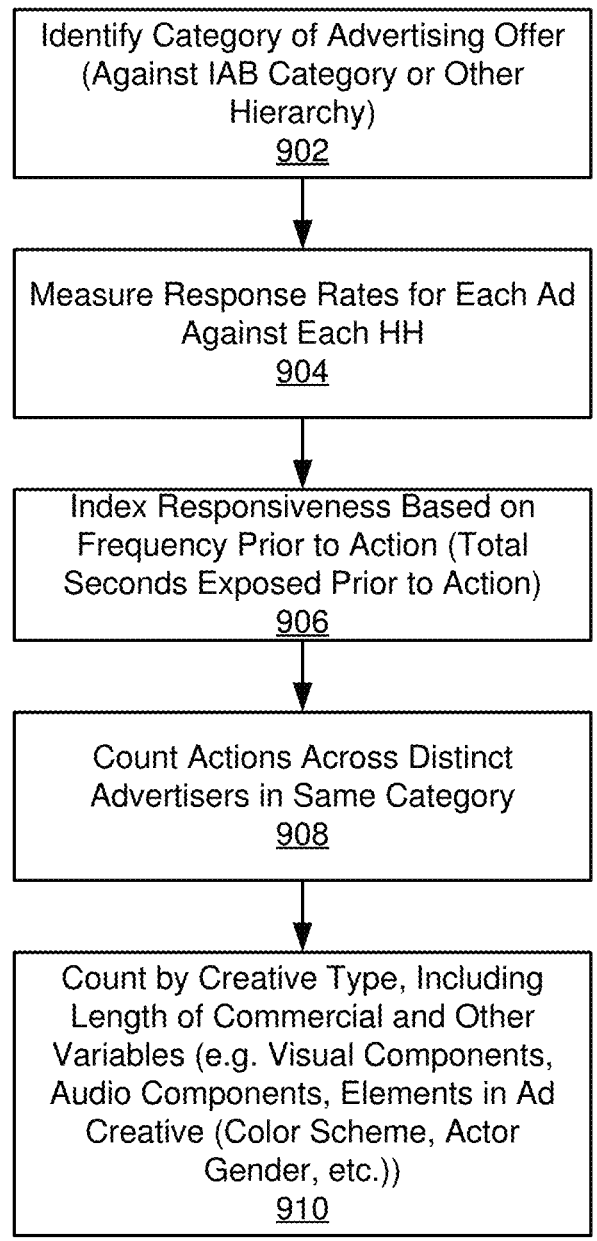
FIG. 9 is a flow chart illustrating various other example metrics used to determine extent and type of advertising exposure.

Referring to FIG. 9, the methods here may also include capabilities to identify category of an advertising offer, for example, as compared to categories classified by the Interactive Advertising Bureau ("IAB") or other such hierarchy in the advertising industry. The methods include measuring response rates for each ad in each household ("HH"), as described by block 904. In some embodiments, the index responsiveness is based on frequency determined prior to action, for example total seconds exposed prior to action, as described by block 906. The methods include counting actions across distinct advertisers in the same category as described by block 908. The methods include counting by creative type or outcome, including the length of commercial and other variables, for example, visual components, audio components, elements in the ad creative or ad outcome, for example, color scheme, actor gender, etc., as described by block 910.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present inventive technology be limited not by this detailed description, but rather by the claims of this application. As will be understood by those familiar with the art, the present inventive technology may be embodied in other specific forms without departing from the spirit or essential characteristics thereof. Likewise, the particular naming and division of the modules, routines, features, attributes, methodologies and other aspects are not mandatory or significant, and the mechanisms that implement the present inventive technology or its features may have different names, divisions and/or formats. Furthermore, as will be apparent to one of ordinary skill in the relevant art, the modules, routines, features, attributes, methodologies and other aspects of the present inventive technology can be implemented as software, hardware, firmware or any combination of the three. Also, wherever a component, an example of which is a module, of the present inventive technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present inventive technology is intended to be illustrative.

What is claimed is:

1. A method for placement of advertising over a network on streaming publisher content viewable via a connected household device or over-the-top delivery mechanism, the method comprising:
   storing executable code with instructions in a memory, the memory causing one or more processors to execute a plurality of control actions via an interface connection, by executing one or more operations configured to:
   receive, by at least one of the one or more processors, an advertisement bid request from at least one of the connected household device and the over-the-top delivery mechanism facilitating viewing of the streaming publisher content, wherein said streaming publisher content is viewable over the connected household device and the over-the-top delivery mechanism including a smart television, mobile device, desktop computer, networked photo frames, set-up boxes, gaming consoles, streaming device, and a domestic appliance configured to function within an IOT network;
   transmit, by at least one of the one or more processors, an advertisement bid response to the advertisement bid request from a select bidder platform;
   create a household-effectiveness graph configured to enhance a bid request with additional data provided by a third-party data enhancement server;
   designate, by at least one of the one or more processors, a scoring platform configured to indicate unique household identifiers by obtaining and using a combination of signals including signals representative of a unique identification associated with at least one of the connected household device and the over-the-top delivery mechanism, a time stamp, and a physical location to create outcome event data for every household exposed to a particular advertisement bid response, wherein said outcome event data is used to compute a responsiveness score for each household; and append, by at least one of the one or more processors, additional household devices to said exposed household record, and use a script tracking pixel to record website visit data including at least one of an initial-visit to an website by a viewer and an action outcome performed on the website and application and wherein said household effectiveness graph provides the additional data including at least one of postal data, a latitude or longitude, an IP type, age of a consumer, gender of a consumer, and a household income.

2. The method of claim 1, wherein said scoring platform determines said unique identification by using said combination of signals received to determine audience responsiveness to display and audio advertising.

3. The method of claim 2, wherein the combination of signals provide data that is recorded to create an exposed household record.

4. The method of claim 3, further comprising:
tracking sequence, frequency and cross-channel exposure of advertising.

5. The method of claim 4, wherein new identifiers for said additional household devices are recorded.

6. The method of claim 5, wherein said streaming publisher content is viewable by an advertiser's website or application and said website visit data of each visitor viewer is recorded.

7. The method of claim 6, wherein an attribution engine is coupled to the one or more processors, wherein the attribution engine adds a plurality of new results to known or new households.

8. A system for placement of advertising over a network on streaming publisher content that is viewable, comprising:
one or more processors; and
memory storing instructions executable by at least one of the processors and causing the at least one of the one or more processors to:
receive an advertisement bid request from at least one of the connected household device and the over-the-top delivery mechanism facilitating viewing of the streaming publisher content, wherein said streaming publisher content is viewable over the connected household device and the over-the-top delivery mechanism including a smart television, mobile device, desktop computer, networked photo frames, set-up boxes, gaming consoles, streaming device, and a domestic appliance configured to function within an IOT network;
create a household-effectiveness graph configured to enhance a bid request with additional data provided by a third-party data enhancement server;
link a scoring platform configured to generate and indicate unique household identifiers by obtaining and using a combination of signals including signals representative of a unique identification associated with at least one of the connected household device and the over-the-top delivery mechanism, a time stamp, and a physical location and create an exposed household outcome record for every household exposed to a particular advertisement bid response; and
append additional household devices to said exposed household outcome record, and use a script tracking pixel to record website visits and store data records including at least one of an initial-visit to a website by a viewer and an action outcome performed on the website and application and wherein additional data includes at least one of postal data, a latitude or longitude, an IP type, age of a consumer, gender of a consumer, and a household income.

9. The system of claim 8, wherein said scoring platform determines said unique household identifiers by using said combination of signals received.

10. The system of claim 8, wherein the combination of signals provide data that is recorded to create an exposed household record.

11. The system of claim 10, wherein said one or more processors further append additional household devices to said exposed household record.

12. The system of claim 11, wherein new identifiers for said additional household devices are provided for linking and recording by an attribution engine.

13. The system of claim 12, wherein said streaming publisher content is viewable by an advertiser's website or application and said website visit data of each visitor viewer is recorded.

14. The system of claim 13, wherein said system further comprises an attribution engine coupled to the one or more processors, wherein the attribution engine adds a plurality of new results to known or new households.

15. The system of claim 8, wherein said one or more processors creates a household-effectiveness graph configured to enhance a bid request with additional data provided by a third-party data enhancement server.

16. The system of claim 15, wherein said additional data includes at least one of postal data, a latitude or longitude, an IP type, age of a consumer, gender of a consumer, and a household income.

17. The system of claim 15, wherein said additional data includes at least two or more of postal data, a latitude or longitude, an IP type, age of a consumer, gender of a consumer, and a household income.

18. The system of claim 15, wherein said additional data includes postal data, a latitude or longitude, an IP type, age of a consumer, gender of a consumer, and a household income.

19. The system of claim 8, wherein an advertiser provides a lifetime value metrics to each household.

* * * * *